(12) United States Patent
Edlis et al.

(10) Patent No.: US 10,015,812 B2
(45) Date of Patent: Jul. 3, 2018

(54) APPARATUS, SYSTEM AND METHOD OF SETTING TRANSMIT SLOTS IN A WIRELESS COMMUNICATION NETWORK

(71) Applicant: INTEL IP CORPORATION, Santa Clara, CA (US)

(72) Inventors: Ophir Edlis, Modi'in-Maccabim-Re'ut (IL); Solomon B. Trainin, Haifa (IL); Eran Sudak, Herzliya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 12 days.

(21) Appl. No.: 15/039,137

(22) PCT Filed: Dec. 25, 2013

(86) PCT No.: PCT/US2013/077728
§ 371 (c)(1),
(2) Date: May 25, 2016

(87) PCT Pub. No.: WO2015/099715
PCT Pub. Date: Jul. 2, 2015

(65) Prior Publication Data
US 2017/0026994 A1 Jan. 26, 2017

(51) Int. Cl.
*H04W 72/12* (2009.01)
*H04W 74/04* (2009.01)
*H04W 72/04* (2009.01)

(52) U.S. Cl.
CPC ....... *H04W 72/1268* (2013.01); *H04W 74/04* (2013.01); *H04W 72/0446* (2013.01)

(58) Field of Classification Search
CPC ......... H04W 72/0446; H04W 72/1268; H04W 74/04

USPC .......................................................... 370/329
See application file for complete search history.

(56) References Cited

U.S. PATENT DOCUMENTS

| | | | | |
|---|---|---|---|---|
| 2001/0037229 A1* | 11/2001 | Jacobs | ................... | G06Q 10/02 705/7.14 |
| 2002/0105970 A1* | 8/2002 | Shvodian | ............... | H04W 16/14 370/468 |
| 2002/0136268 A1* | 9/2002 | Gan | ....................... | H04B 1/715 375/133 |

(Continued)

FOREIGN PATENT DOCUMENTS

EP 2400810 12/2011

OTHER PUBLICATIONS

International Preliminary Report on Patentability for PCT/US2013/077728, dated Jul. 7, 2016, 7 pages.

(Continued)

*Primary Examiner* — Stephen J Clawson
(74) *Attorney, Agent, or Firm* — Shichrur & Co.

(57) ABSTRACT

Some demonstrative embodiments include apparatuses, systems and/or methods of setting transmit slots in a wireless communication network. For example, an apparatus may include a scheduler to set a suggested start time of a first transmit slot to transmit over a wireless communication medium, and, if a start of a medium free time for the wireless communication medium is after the suggested start time, to shift the suggested start time to a shifted start time that coincides with the start of the medium free time, and to set a suggested start time of a second transmit slot based on the shifted start time.

24 Claims, 4 Drawing Sheets

(56) References Cited

U.S. PATENT DOCUMENTS

| | | |
|---|---|---|
| 2003/0193908 A1* | 10/2003 | Cain .................. H04B 7/0491 370/330 |
| 2004/0013127 A1* | 1/2004 | Shvodian ............. H04W 74/02 370/442 |
| 2005/0215284 A1 | 9/2005 | Su et al. |
| 2008/0232344 A1 | 9/2008 | Basu et al. |
| 2009/0059887 A1 | 3/2009 | Pekonen et al. |
| 2009/0147756 A1 | 6/2009 | Yang et al. |
| 2009/0147768 A1 | 6/2009 | Ji et al. |
| 2013/0176993 A1 | 7/2013 | Trainin et al. |

OTHER PUBLICATIONS

International Search Report and Written Opinion for PCT/US2013/077728, dated Sep. 24, 2014, 8 pages.
Wigig Wireless Gigabit Alliance, Wigig MAC and PHY Specification Version 1.1, Apr. 2011, 442 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
European Search Report for European Patent Application No .13900553.2, dated Jul. 27, 2017, 8 pages.

* cited by examiner

APPARATUS, SYSTEM AND METHOD OF SETTING TRANSMIT SLOTS IN A WIRELESS COMMUNICATION NETWORK

TECHNICAL FIELD

Some demonstrative embodiments relate to setting transmit slots in a wireless communication network.

BACKGROUND

Some wireless communication technologies may be configured for communication of multiple dedicated services.

For example, the Wireless-Gigabit (WiGig) technology, e.g., according to the *Wireless Gigabit Alliance, Inc WiGig MAC and PHY Specification Version* 1.1, April 2011, *Final specification*, is designed to carry multiple dedicated services, such as audio-visual (A/V) and input output (IO).

A network controller, for example, an Access Point (AP), a Group Owner (GO) or a Personal-Basis-Service-Set (PBSS) Control Point (PCP), may be configured to manage the scheduling of traffic between devices of a wireless communication network. For example, a PCP may manage traffic between devices belonging to a PBSS controlled by the PCP, for example, to guarantee a required Quality-of-Service (QoS) for each service.

In dense environments, for example, environments having a plurality of PBSS networks present, communications between devices belonging to a first PBSS may cause interference to devices belonging to a second PBSS.

In such cases, the traffic scheduling, which is defined by a PCP of the first PBSS, may not always be executed as planned, e.g., due to the interference from the devices of the second PBSS. As a result, some services, which are to be communicated within the first PBSS, may suffer delay or even starvation, and/or devices of the first PBSS may suffer excessive power consumption.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements.

The figures are listed below.

DETAILED DESCRIPTION

Figure 1:
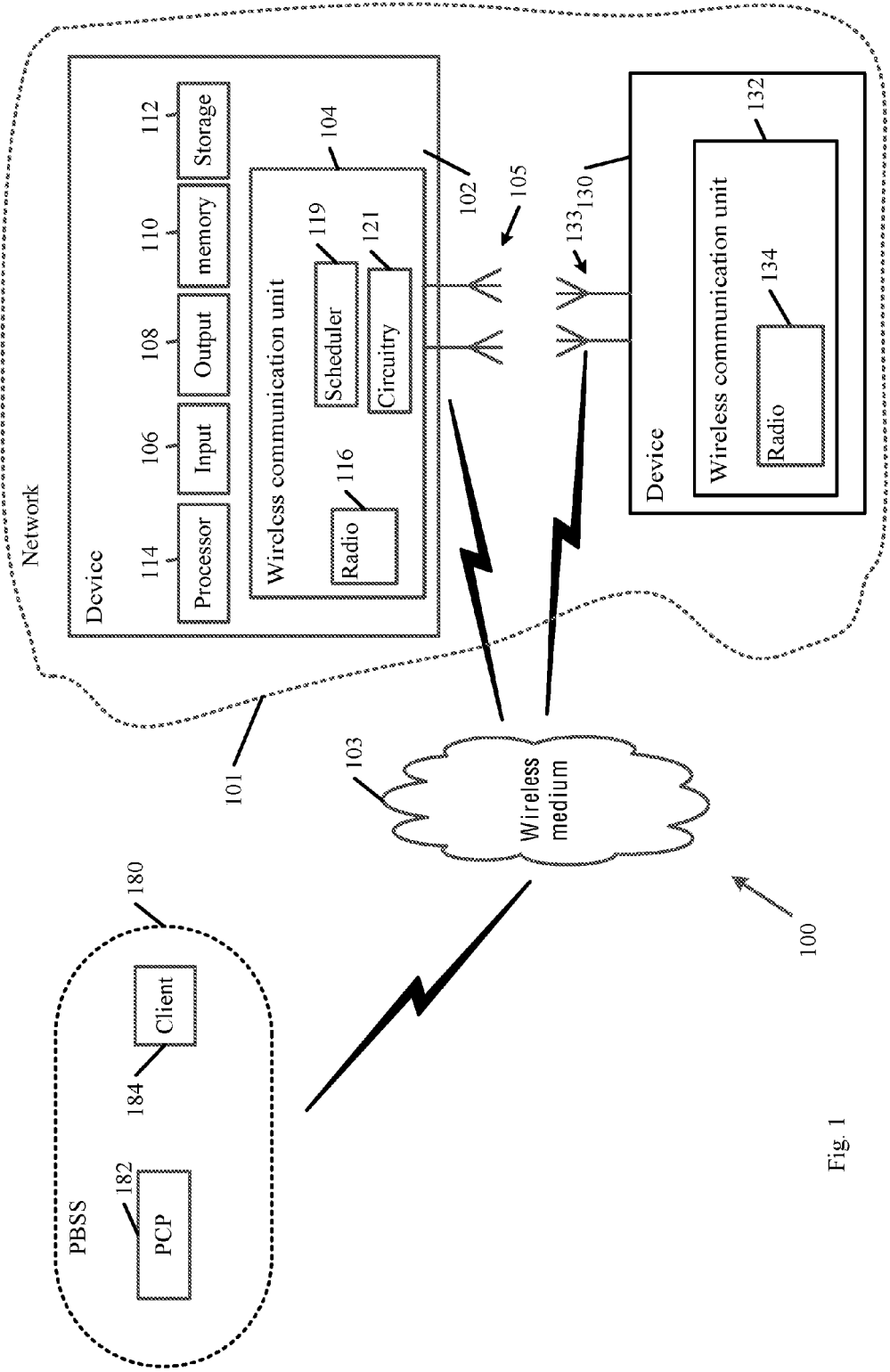
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; *IEEE*802.11 *task group ac*

(TGac) ("IEEE802.11-09/0308r12 —TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing and/or Wireless Fidelity (WiFi) Alliance (WFA) Peer-to-Peer (P2P) specifications (WiFi P2P technical specification, version 1.2, 2012), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "personal basic service set" (PBSS), as used herein, may relate to a basic service set (BSS) that forms a self-contained network. For example, the PBSS may operate in the DMG band, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner", as used herein, may relate to an "AP-like" entity, when referring to non-DMG networks, or to a PCP, when referring to DMG networks that may provide and use connectivity between clients.

The phrase "P2P Group", as used herein, may relate to a set of devices including one P2P Group Owner and zero or more P2P Clients.

A wireless P2P wireless communication network ("P2P network" or "P2P group") may include a plurality of wireless communication devices capable of supporting device-to device communication.

The phrase "Contention Based Access Period (CBAP)", as used herein, may relate to a time period, during which wireless communication devices may be allowed to communicate using a suitable contention-based mechanism. In one example, the CBAP may include an access period allocated within a Data Transfer Time (DTT) within a beacon interval (BI). The CBAP may include, for example, a time period within the DTT of a DMG Basic Service Set (BSS), e.g., where enhanced distributed channel access (EDCA) is used.

The phrase "Transmit Opportunity (TxOP)", as used herein, may relate to an interval of time when a particular STA, e.g., a QoS STA, has the right to initiate frame exchange sequences onto the WM. A TxOP may be defined, for example, by a starting time and a maximum duration and/or any other parameters. In one example, the TxOP may be obtained by the STA by successfully contending for the channel or assigned by a coordinator.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices, e.g., including wireless communication devices 102 and/or 130, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, one of wireless communication devices 102 and 130 may include a wireless source device, e.g., a computer input device, for example, a keyboard, a mouse, a joystick, a trackball, a remote control, and the like; and/or one of wireless communication devices 102 and 130 may include a wireless destination device, e.g., a display, a printer, a scanner, a storage, and the like.

In some demonstrative embodiments, wireless communication devices 102 and/or 130 may include wireless communication units 104 and/or 132, respectively, to perform wireless communication between wireless communication devices 102 and 130 and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include, for example, antennas suitable for directional communication, e.g., using beamforming techniques. For example, antennas 105 and/or 133 may include a phased array antenna, a single element antenna, a set of switched beam antennas, and/or the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication unit 104 may include one or more radios 116 and/or wireless communication unit 132 may include one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may form, or may be part of a wireless communication network 101. Wireless communication network 101 may include, for example, a P2P network.

In some demonstrative embodiments, network 101 may include, for example, a PBSS including a PCP STA and one or more non-PCP STAs. For example, device 102 may perform the functionality of a PCP STA of network 101 and device 130 may perform the functionality of a non-PCP STA of network 101.

In other embodiments, network 101 may include any other wireless communication network.

In some demonstrative embodiments, wireless communication devices 102 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and/or 130 may perform the functionality of DMG stations ("DMG STA"). For example, wireless communication devices 102 and/or 130 may be configured to communicate over the DMG band.

Some demonstrative embodiments are described below with respect to DMG stations and/or a WiGig network. However, other embodiments may be implemented with respect to any other stations and/or any other network.

In some demonstrative embodiments, wireless communication devices 102 and 130 may communicate over the DMG band, e.g., in accordance with the WiGig Specifications. For example, devices 102 and 130 may employ directional RF signals. Such directional signals may be created by at least one antenna array, e.g., by beamforming techniques. In other embodiments, wireless communication devices 102 and 130 may communicate over any other band and/or according to any other protocol and/or specification.

In some demonstrative embodiments, wireless communication units 104 and 132 may communicate a plurality of streams of a plurality of service types ("services"), e.g., including one or more services defined according to a plurality of dedicated protocols, and the like.

The term "stream", as used herein, may include a flow of data pertaining to a particular service type. The stream may be communicated from a first station ("source") of system 100, e.g., a STA implemented by one of wireless communication units 104 and 132, to a second station ("destination") of system 100, e.g., a station implemented by another one of wireless communication units 104 and 132. The stream may include, for example, a bidirectional stream or a unidirectional stream.

In some demonstrative embodiments, a plurality of different priorities may be assigned to the streams of the plurality of service types. The priorities may be assigned to the streams, for example, according to a predefined priority scheme.

The priority of a stream may rank the stream, for example, to differentiate or unite the stream with one or more other streams. For example, streams of one or more service types may be provided with a first priority, while one or more streams of one or more other service types may be provided with a second priority, lesser than or greater than the first priority.

In some demonstrative embodiments, the plurality of streams may include, for example, one or more of control streams, audio streams, video streams, periodic streams, non-periodic streams, isochronous (ISO) streams, asynchronous streams, internet-protocol (IP) streams, high priority IP streams, low priority IP streams, WiGig Display Extension (WDE) streams, WiGig Serial Extension (WSE) streams, bulk streams, Best Effort (BE) streams, Bulk Only Transfer (BOT) streams, and/or any other streams.

In some demonstrative embodiments, wireless communication unit 104 may perform the functionality of a network controller of network 101. For example, wireless communication unit 101 may perform the functionality of an Access Point (AP), a Group Owner (GO) or a PCP, which may be configured to manage the scheduling of traffic between devices of wireless communication network 101.

In one example, wireless communication network 101 may include a PBSS, and wireless communication unit 104 may perform the functionality of a PCP STA to manage traffic between devices belonging to network 101, e.g., devices 102 and 130, for example, to guarantee a required Quality-of-Service (QoS) for each service.

In some demonstrative embodiments, system 100 may be deployed in a dense environment, which may include a plurality of wireless communication networks. For example, system 100 may include at least one PBSS 180, e.g., including a PCP STA 182 and one or more non-PCP (client) stations 184.

In some demonstrative embodiments, communications between devices belonging to PBSS 180 may cause interference to devices belonging to network 101.

In such cases, a traffic scheduling, which may be defined by wireless communication unit 104, may not always be executed as planned, e.g., due the interference from the devices of PBSS 182, e.g., as described below. As a result, some services, which are to be communicated within network 101, may suffer delay or even starvation, and/or devices of network 101 may suffer excessive power consumption, e.g., as described below.

Figure 2:
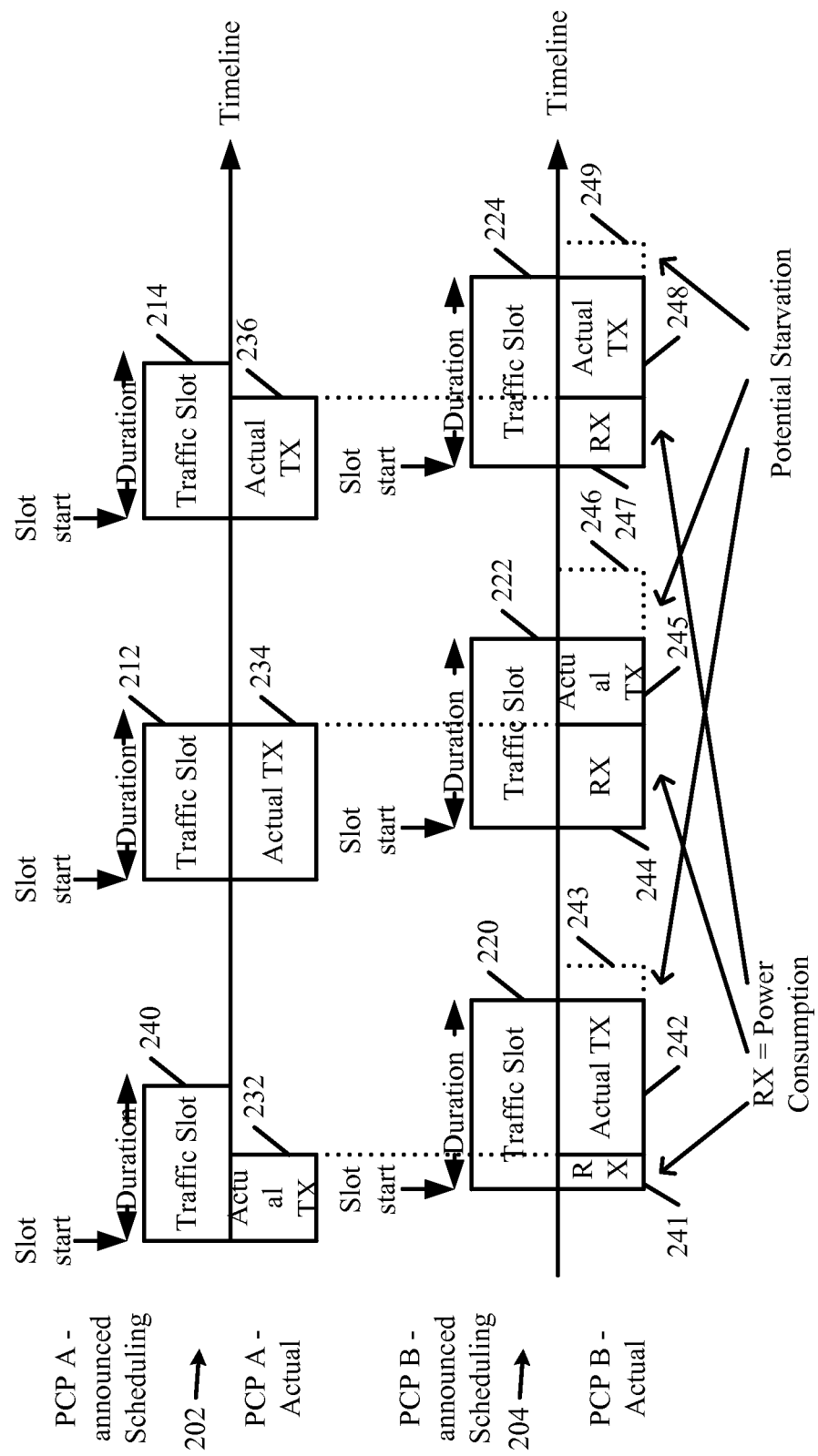
FIG. 2 is a schematic illustration of a relative timing of first and second sequences of traffic slots scheduled according to preset slot start times, in accordance with some demonstrative embodiments.

Reference is made to FIG. 2, which schematically illustrates a relative timing of a first sequence 202 of traffic slots scheduled according to preset slot start times and a second sequence 204 of traffic slots scheduled according to preset slot start times, in accordance with some demonstrative embodiments.

In some demonstrative embodiments, the sequence 202 of traffic slots may be scheduled by a first network controller of a first wireless communication network, and the sequence 204 of traffic slots may be scheduled by a second network controller of a second wireless communication network. For example, a first PCP, denoted PCP A, of a first PBSS, may schedule the sequence 202 of time slots; and a second PCP, denoted PCP B, of a second PBSS, may schedule the sequence 204 of time slots.

In some demonstrative embodiments, the PCP A may pre-allocate the sequence 202 of traffic slots, for example, based on one or more required attributes for traffic communicated within the first PBSS, e.g., according to Bandwidth (BW) and latency Service Level Agreement (SLA) requirements. The PCP B may pre-allocate the sequence 204 of traffic slots, for example, based on one or more required attributes for traffic communicated within the second PBSS, e.g., according to BW and latency Service Level Agreement (SLA) requirements.

In some demonstrative embodiments, the sequences 202 and/or 204 may include periodic sequences of traffic slots, for example, when traffic within the first and/or second PBSS is periodic in nature. For example, sequence 202 may include a periodic sequence of slots 210, 212 and 214; and/or sequence 204 may include a periodic sequence of slots 220, 222 and 224.

In some demonstrative embodiments, PCP A may announce the sequence 202 to devices within the first PBSS ("the PCP A devices"), and PCP B may announce the sequence 204 to devices within the second PBSS ("the PCP B devices").

In some demonstrative embodiments, a wireless communication device of the first PBSS ("the PCP A device") may use the allocated traffic slot sequence 202 to set a transmit slot to transmit over a wireless communication medium; and a wireless communication device of the second PBSS ("the PCP B device") may use the allocated traffic slot sequence 204 to set a transmit slot to transmit over a wireless communication medium, e.g., as described below.

In some demonstrative embodiments, one option of setting the transmit slots may include setting each transmit slot to begin at a fixed start time of a corresponding traffic slot, and to have a predefined maximal duration, e.g., up to a fixed duration of the traffic slot. However, as discussed below, this option may not be beneficial, for example, as this option may result in delay or even starvation of services, and/or excessive power consumption.

For example, as shown in FIG. 2, the PCP A device in the first PBSS may set a transmit slot 232 to begin at a fixed start of traffic slot 210, a transmit slot 234 may be set to begin at a fixed start of traffic slot 212, and a transmit slot 236 may be set to begin at a fixed start of traffic slot 214.

As also shown in FIG. 2, each of transmit slots 232, 234 and 236 may be allowed to have a maximal duration not exceeding the duration of a corresponding traffic slot of traffic slots 210, 212 and 214.

In some demonstrative embodiments, the PCP A and the PCP B may schedule the traffic slot sequences 202 and 204 with at least partial overlapping, for example, if the PCP and the PCP B are not synchronized. For example, as shown in FIG. 2, traffic slot 220 may partially overlap traffic slot 210, traffic slot 222 may partially overlap traffic slot 212, and/or traffic slot 224 may partially overlap traffic slot 214.

As also shown in FIG. 2, a start time of traffic slot 220 may be within traffic slot 210, a start time of traffic slot 222 may be within traffic slot 212, and a start time of traffic slot 224 may be within traffic slot 214.

In some demonstrative embodiments, a collision may occur, for example, if a PCP B device of the second PBSS attempts a transmission during a time period of traffic slot 20, which overlaps transmit slot 232, during a time period of traffic slot 222, which overlaps transmit slot 234, or during a time period of traffic slot 224, which overlaps transmit slot 236.

In some demonstrative embodiments, devices of the first and second PBSSs may implement a collision avoidance mechanism, for example, a carrier sense mechanism. For example, the PCP B device may implement a "listen before talk" mechanism, according to which the PCP B device is to determine whether the wireless communication medium is free prior to attempting a transmission, e.g., even during a pre-allocated traffic slot.

In some demonstrative embodiments, the overlap between traffic slot sequence 204 and traffic slot sequence 202 may result in the PCP B device being able to transmit during only part of the traffic slots 204, e.g., as described below.

In some demonstrative embodiments, the option of setting each transmit slot to begin at a fixed start time of a corresponding traffic slot, and to have a predefined maximal duration, e.g., up to a fixed duration of the traffic slot, may result in the PCP B device using a reduced transmit slot duration.

For example, as shown in FIG. 2, the PCP B device may be required to operate at a receive (Rx) state at a beginning of traffic slot 220 and to remain in the Rx state during a time period 241, e.g., as long as the PCP A device is using transmit slot 232.

Accordingly, an actual remaining transmit slot 242, which may be used by the PCP B device, may be limited by the end of traffic slot 220.

As also shown in FIG. 2, the PCP B device may be required to operate at the Rx state at a beginning of traffic slot 222 and to remain in the Rx state during a time period 244, e.g., as long as the PCP A device is using transmit slot 234.

Accordingly, an actual remaining transmit slot 245, which may be used by the PCP B device, may be limited by the end of traffic slot 222.

As also shown in FIG. 2, the PCP B device may be required to operate at the Rx state at a beginning of traffic slot 224 and to remain in the Rx state during a time period 247, e.g., as long as the PCP A device is using transmit slot 236.

Accordingly, an actual remaining transmit slot 248, which may be used by the PCP B device, may be limited by the end of traffic slot 224.

Therefore, the option of setting each transmit slot to begin at a fixed start time of a corresponding traffic slot, and to have the predefined maximal duration may result in the PCP B device operating at the Rx state for relatively long periods, e.g., periods 241, 244 and 247. As a result the power consumption of PCP B device may increase.

Additionally, setting each transmit slot to begin at a fixed start time of a corresponding traffic slot, and to have the predefined maximal duration may result in the PCP B device having relatively short actual transmit slots, e.g., transmit slots 242, 245 and 248.

In some demonstrative embodiments, the traffic slots 220, 222 and 224 may be allocated based on the actual BW and/or latency SLA requirements of the PCP device B. Accordingly, the actual transmit slots 242, 245 and 248, which may be shorter than the traffic slots 220, 222 and 224, may result in potential delay or even potential starvation of periodic services of the PCP B device.

For example, as shown in FIG. 2, a period 243 may be a difference between the duration of traffic slot 220 and actual transmit slot 242, a period 246 may be a difference between the duration of traffic slot 222 and actual transmit slot 244, and a period 249 may be a difference between the duration of traffic slot 224 and actual transmit slot 248.

In some demonstrative embodiments, a longer total accumulated duration of periods 243, 246 and 249 may result in a longer delay and/or an increased probability of starvation of periodic services of the PCP B device. The delay and/or starvation of the periodic services may result in failure to provide a required QoS.

Referring back to FIG. 1, in some demonstrative embodiments, wireless communication devices of system 100 may be configured to set transmit slots by setting a distance between consecutive slots, for example, instead of setting a fixed beginning of the transmit slots, e.g., as described below.

In some demonstrative embodiments, wireless communication unit 104 may set a start time of a first transmit slot in a "floating" manner, e.g., as described below.

In some demonstrative embodiments, wireless communication unit 104 may include a scheduler 119 to set the transmit slots. Wireless communication unit 104 may also include circuitry 121 coupled to scheduler 119. For example, circuitry 121 may include one or more Media Access Control (MAC) layer components, Physical Layer (PHY) components and/or any other component of wireless communication unit 104

In some demonstrative embodiments, scheduler 119 may set a suggested start time of the first transmit slot, and may selectively shift the suggested start time of the first transmit slot based on a start of a medium free time, e.g., as described below. The medium-free time may include a time at which wireless communication medium 103 is to be free for transmission.

In some demonstrative embodiments, wireless communication unit 104 may utilize any suitable mechanism to determine the medium-free time.

In one example, wireless communication unit 104 may utilize a carrier sensing mechanism to sense whether wireless communication medium 103 is free. For example, wireless communication unit 104 may operate at the Rx state to listen for any transmission detected over wireless communication medium 103. In one example, wireless communication unit 104 may utilize a Clear Channel Assessment (CCA) mechanism or any other mechanism to determine whether wireless communication medium 103 is free.

In another example, wireless communication unit 104 may be able to receive an indication from another device to indicate the medium-free time.

In some demonstrative embodiments, scheduler 119 may wait until a start of the medium free time, for example, if a start of the medium free time is after the suggested start time of the first transmit slot, e.g., as described below.

In some demonstrative embodiments, scheduler 119 may shift the suggested start time of the first transmit slot to a shifted start time that coincides with the start of the medium free time, for example, if the start of the medium free time is after the suggested start time of the first transmit slot, e.g., as described below.

In some demonstrative embodiments, scheduler 119 may set a start time of a second time slot, subsequent to the first time slot, according to the shifted start time of the first transmit slot, e.g., as described below.

In some demonstrative embodiments, scheduler 119 may set a start time of the second time slot to be a predefined time period after the shifted start time of the first transmit slot.

In some demonstrative embodiments, the predefined time period may be equal, for example, to a time period between consecutive traffic slots assigned to wireless communication unit 104.

In some demonstrative embodiments, a duration of the first transmit slot may be equal to or lesser than the distance between the suggested start time of the second time slot and the shifted start time of the first transmit slot.

In some demonstrative embodiments, scheduler 119 may shift the suggested start time of the second transmit slot to a shifted start time that coincides with a start of a second, e.g., subsequent, medium free time, for example, if the start of the second medium free time is after the suggested start time of the second transmit slot.

In some demonstrative embodiments, scheduler 119 may set a suggested start time of a third transmit slot based on the shifted start time of the second transmit slot.

In some demonstrative embodiments, scheduler 119 may repeatedly set additional subsequent transmit slots in a similar manner, for example, such that a suggested start time of each transmit slot is set at a predefined distance from the shifted start time of an immediately previous transmit slot, e.g., as described below.

For example, scheduler 119 may set a distance between the scheduled start time of the second transmit slot and the shifted start time of the first transmit slot to be equal to a distance between the suggested start time of the third transmit slot and the shifted start time of the second transmit slot.

In some demonstrative embodiments, wireless communication unit 104 may schedule at least one contention based access periods (CBAP), which may be configured, for example, to enable allocation of the transmit slots, for example, in a manner, which may ensure that communication may be performed during the transmit slots, e.g., as described below.

In some demonstrative embodiments, wireless communication unit 104 may announce at least one CBAP covering at least a continuous time period from the start time of the suggested first transmit slot to an end of the second transmit slot.

In one example, wireless communication unit 104 may announce a single CBAP covering at least the continuous time period.

In another example, wireless communication unit 104 may announce a sequence of consecutive CBAPs covering at least the continuous time period.

Figure 3:
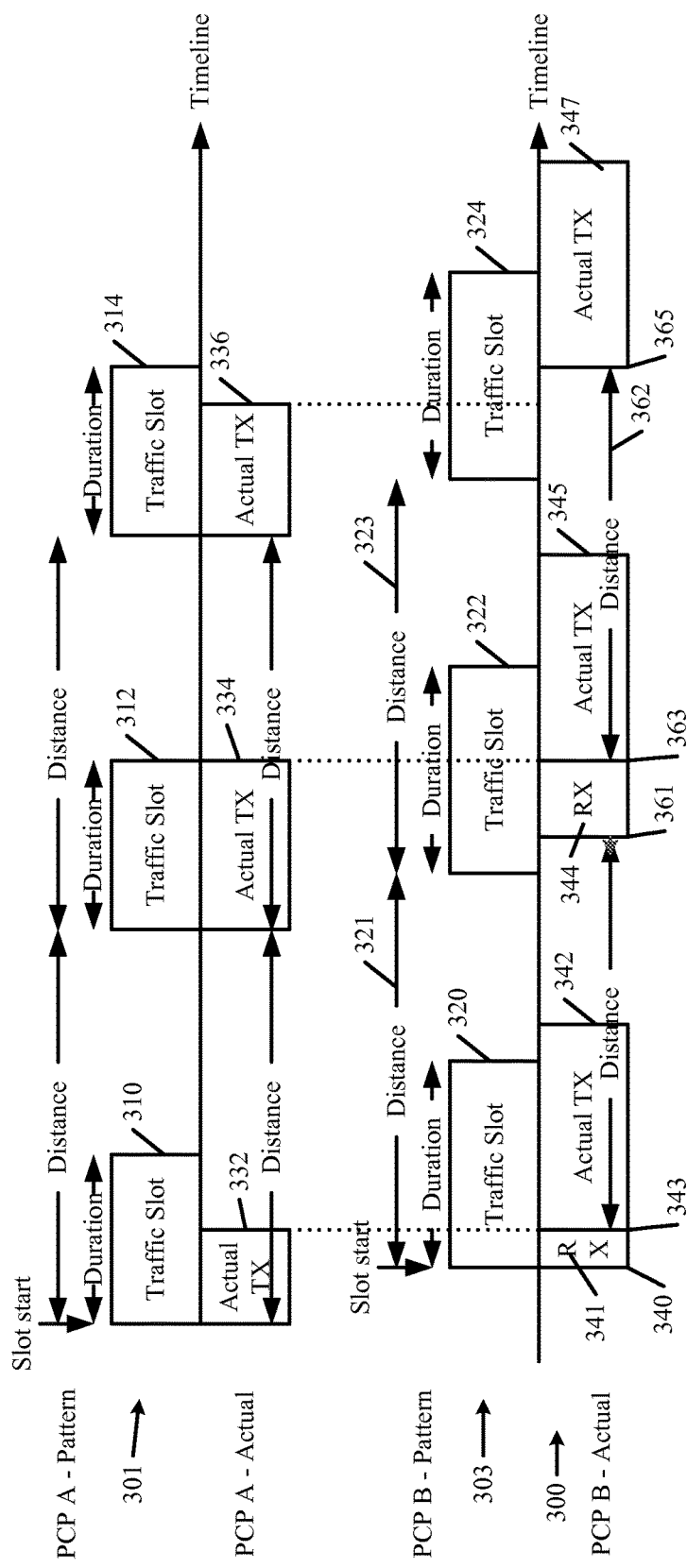
FIG. 3 is a schematic illustration of a sequence of transmit slots scheduled according to shifted slot start times, in accordance with some demonstrative embodiments.

Reference is made to FIG. 3, which schematically illustrates a sequence of transmit slots 300 scheduled according to shifted slot start times, in accordance with some demonstrative embodiments. For example, scheduler 119 (FIG. 1) may schedule transmit slots 300, e.g., as described below.

In some demonstrative embodiments, a sequence 301 of traffic slots may be scheduled by a first network controller of a first wireless communication network, and the sequence 303 of traffic slots may be scheduled by a second network controller of a second wireless communication network. For example, the PCP A, of the first PBSS, may schedule the sequence 301 of time slots; and the PCP B, of the second PBSS, may schedule the sequence 303 of time slots. For example, PCP 182 (FIG. 1) may perform the functionality of the PCP A, and wireless communication unit 104 (FIG. 1) may perform the functionality of the PCP B.

In some demonstrative embodiments, PCP 182 (FIG. 1) may pre-allocate the sequence 301 of traffic slots, for example, based on one or more required attributes for traffic communicated within PBSS 180, e.g., according to Bandwidth (BW) and latency Service Level Agreement (SLA) requirements. Wireless communication unit 104 (FIG. 1) may pre-allocate the sequence 303 of traffic slots, for example, based on one or more required attributes for traffic communicated within network 101 (FIG. 1), e.g., according to BW and latency Service Level Agreement (SLA) requirements.

In some demonstrative embodiments, the sequences 301 and/or 303 may include periodic sequences of traffic slots, for example, when traffic within PBSS 180 (FIG. 1) and network 101 (FIG. 1) is periodic in nature. For example, sequence 301 may include a periodic sequence of slots 310, 312 and 314; and/or sequence 303 may include a periodic sequence of slots 320, 322 and 324.

In some demonstrative embodiments, PCP 182 (FIG. 1) may announce the sequence 301 to devices within PBSS 180 (FIG. 1), and wireless communication unit 104 (FIG. 1) may announce the sequence 303 to devices within network 101 (FIG. 1).

In some demonstrative embodiments, PCP 182 (FIG. 1) may use the allocated traffic slot sequence 301 to set a transmit slot to transmit over wireless communication medium 103 (FIG. 1); and wireless communication unit 104 (FIG. 1) may use the allocated traffic slot sequence 303 to set a transmit slot to transmit over wireless communication medium 103 (FIG. 1), e.g., as described below.

In some demonstrative embodiments, PCP 182 (FIG. 1) may set a transmit slot 332 to begin at a start of traffic slot 310, a transmit slot 334 may be set to begin at a start of traffic slot 312, and a transmit slot 336 may be set to begin at a start of traffic slot 314.

In some demonstrative embodiments, each of transmit slots 332, 334 and 336 may be allowed to have a maximal duration not exceeding the duration of a corresponding traffic slot of traffic slots 310, 312 and 314.

In some demonstrative embodiments, traffic slot sequences 301 and 303 may be scheduled with at least partial overlapping, for example, if PCP 182 (FIG. 1) and wireless communication unit 104 (FIG. 1) are not synchronized. For example, as shown in FIG. 3, traffic slot 320 may partially overlap traffic slot 310, traffic slot 322 may partially overlap traffic slot 312, and/or traffic slot 324 may partially overlap traffic slot 314.

As also shown in FIG. 3, a start time of traffic slot 320 may be within traffic slot 310, a start time of traffic slot 322 may be within traffic slot 312, and a start time of traffic slot 324 may be within traffic slot 314.

In some demonstrative embodiments, wireless communication unit 104 (FIG. 1) may set transmit slots 300 by setting a distance between consecutive slots of sequence 300, for example, instead of setting a fixed beginning of the transmit slots, e.g., as described below.

In some demonstrative embodiments, wireless communication unit 104 (FIG. 1) may set a start time of a transmit slot of sequence 300 in a "floating" manner, e.g., as described below.

In some demonstrative embodiments, wireless communication unit 104 (FIG. 1) may define a pattern of scheduling transit slots 300, e.g., by setting a distance between transmit slots 300, e.g., as described below.

In some demonstrative embodiments, wireless communication unit 104 (FIG. 1) may set the suggested start time 340 of a transmit slot 342, for example, to be at a start time of traffic slot 320.

In some demonstrative embodiments, wireless communication unit 104 (FIG. 1) may detect a medium free start time 343. The medium-free start time 343 may include a start of a time at which wireless communication medium 103 (FIG. 1) is to be free for transmission, e.g., as described above.

In some demonstrative embodiments, wireless communication unit 104 (FIG. 1) may shift the suggested start time of the transmit slot 342 to coincide with the medium free start time 343, e.g., as described below.

In some demonstrative embodiments, wireless communication unit 104 (FIG. 1) may set a suggested start time of a subsequent time slot 345 according to the shifted start time 343 of the transmit slot 342, e.g., as described below.

In some demonstrative embodiments, wireless communication unit 104 (FIG. 1) may set the suggested start time of time slot 345 to be a predefined time period ("distance") 360 after the shifted start time 343 of the transmit slot 342.

In some demonstrative embodiments, the distance 360 may be equal, for example, to a time period between consecutive traffic slots of sequence 303, e.g., a distance 321 between traffic slots 322 and 320.

In some demonstrative embodiments, a duration of transmit slot 342 may be equal to or lesser than the distance 360, e.g., to avoid potential overlap between time slot 342 and time slot 345.

In some demonstrative embodiments, wireless communication unit 104 (FIG. 1) may detect a medium free start time 363, at which wireless communication medium 103 (FIG. 1) is determined to be free, and may shift the start time of the transmit slot 345 to coincide with the medium free start time 363.

In some demonstrative embodiments, wireless communication unit 104 (FIG. 1) may set a suggested start time 365 of a subsequent transmit slot 347 based on the shifted start time 363 of the transmit slot 345.

In some demonstrative embodiments, wireless communication unit 104 (FIG. 1) may set the suggested start time 365 of time slot 347 to be a predefined distance 362 after the shifted start time 363 of the transmit slot 345.

In some demonstrative embodiments, the distance 362 may be equal, for example, to a distance 323 between traffic slots 322 and 324.

In some demonstrative embodiments, a duration of transmit slot 345 may be equal to or lesser than the distance 362, e.g., to avoid potential overlap between time slot 345 and time slot 347.

As shown in FIG. 3, in some demonstrative embodiments, wireless communication unit 104 (FIG. 1) may not have to shift the beginning of time slot 347, since, for example, wireless communication medium 103 (FIG. 1) may be free at time 365.

In some demonstrative embodiments, wireless communication unit 104 may repeatedly set additional subsequent transmit slots in a similar manner, for example, such that a suggested start time of each transmit slot is set at a predefined distance from the shifted start time of an immediately previous transmit slot.

In some demonstrative embodiments, wireless communication unit 104 (FIG. 1) may schedule at least one contention based access periods (CBAP), which may be configured, for example, to enable allocation of the transmit slots 300, for example, in a manner, which may ensure that communication may be performed during the transmit slots 300, e.g., as described below.

In some demonstrative embodiments, wireless communication unit 104 (FIG. 1) may announce at least one CBAP covering at least a continuous time period from the suggested start time 340 of transmit slot 340 to an end of transmit slot 347.

In one example, wireless communication unit 104 (FIG. 1) may announce a single CBAP covering at least the continuous time period.

In another example, wireless communication unit 104 (FIG. 1) may announce a sequence of consecutive CBAPs covering at least the continuous time period.

In some demonstrative embodiments, setting transmit slot 300 by setting a distance between consecutive slots of sequence 300, for example, instead of setting a fixed beginning of the transmit slots, may enable shifting the actual transmit slots 303, for example, until the transmit slots 303, e.g., beginning with slot 347, begin at idle periods of one or more other wireless communication network, e.g., during idle periods of traffic slots 301.

In some demonstrative embodiments, setting transmit slot 300 by setting a distance between consecutive slots of sequence 300, for example, instead of setting a fixed beginning of the transmit slots, may result in an increased duration of transmit slots 300.

For example, as shown in FIG. 3, wireless communication unit 104 (FIG. 1) may be required to operate at the Rx state during relatively short time periods 341 and 344, e.g., prior to using transmit slots 342 and 345. As also shown in FIG. 3, wireless communication unit 104 (FIG. 1) may be able to begin using transmit slot 347, e.g., without waiting at the Rx state. Accordingly, power spent by wireless communication unit 104 (FIG. 1) to sense traffic over wireless communication medium 103 (FIG. 1) may be capped by periods 341 and 344, e.g., compared to the periods 241 (FIG. 2), 244 (FIG. 2) and 247 (FIG. 2) discussed above.

Accordingly, the reduced time periods 344 and 341 may enable reducing the power consumption of wireless communication unit 104 (FIG. 1).

In some demonstrative embodiments, setting transmit slot 300 by setting a distance between consecutive slots of sequence 300 may enable efficient allocation of transmit slots 300, for example, without synchronization between wireless communication unit 104 (FIG. 1) and PCP 182 (FIG. 1).

As also shown in FIG. 3, setting transmit slot 300 by setting a distance between consecutive slots of sequence 300 may enable allocating transmit slots 300, which may not be limited by the duration of traffic slots 303.

Accordingly, the actual transmit slots 300 utilized by wireless communication unit 104 (FIG. 1), e.g., transmit slots 342, 345 and 347 may have a duration similar to the duration of traffic slots 320, 322 and 324.

In some demonstrative embodiments, the traffic slots 320, 322 and 324 may be allocated based on the actual BW and/or latency SLA requirements of wireless communication unit (FIG. 1). Accordingly, the actual transmit slots 342, 345 and 347, which may similar duration as the traffic slots 320, 322 and 324, may enable reducing probability of potential delay or potential starvation of periodic services of wireless communication unit 104 (FIG. 1).

In some demonstrative embodiments, traffic slots 301 and 303 may be allocated using a fixed distance between consecutive traffic slots.

In some demonstrative embodiments, the distance 360 between consecutive transmit slots 300 may be equal to the distance between traffic slots 301.

In some demonstrative embodiments, a PCP, e.g., wireless communication unit 104 (FIG. 1), may communicate the distance 360 to devices within a PBSS managed by the PCP, e.g., network 101 (FIG. 1). According to these embodiments, distance 360 may be aligned by wireless communication unit 104 (FIG. 1) with distances utilized between traffic slots 301, e.g., according to a ratio of 2:1, or any other ratio.

In some demonstrative embodiments, a total actual time of actual transmit slots used within system 100 (FIG. 1) during overlapping traffic slots may be equal to or lesser than the distance 321.

Figure 4:
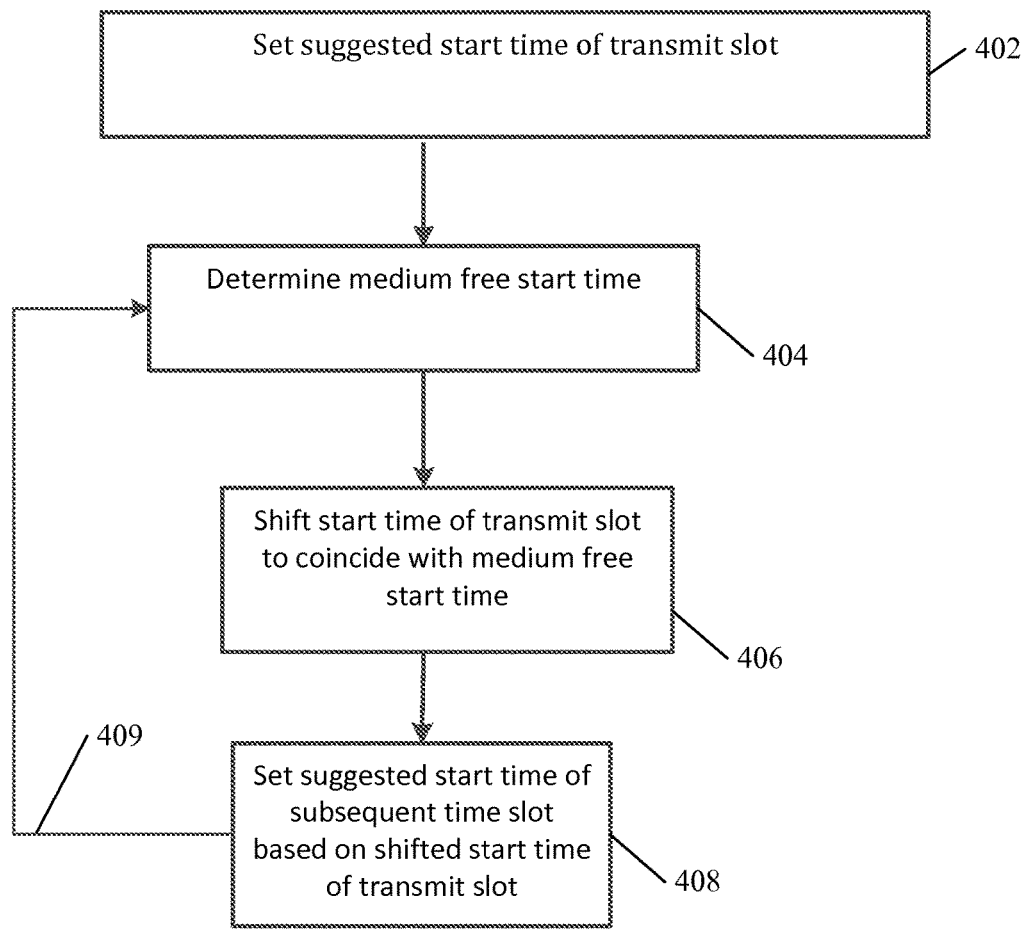
FIG. 4 is a schematic flow-chart illustration of a method of setting transmit slots in a wireless communication network, in accordance with some demonstrative embodiments.

FIG. 4 is a schematic flow-chart illustration of a method of setting transmit slots in a wireless communication network, in accordance with some demonstrative embodiments. In some demonstrative embodiments, one or more of the operations of the method of FIG. 4 may be performed by one or more elements of a system, e.g., system 100 (FIG. 1), a wireless communication device, e.g., wireless communication devices 102, 130 and/or 182 (FIG. 1), a wireless communication unit, e.g., wireless communication units 104, and/or 132 (FIG. 1), and/or a scheduler, e.g., scheduler 119 (FIG. 1).

As indicated at block 402, the method may include setting a suggested start time of a transmit slot to transmit over a wireless communication medium. For example, scheduler 119 (FIG. 1) may set suggested start time 340 (FIG. 3) of transmit slot 342 (FIG. 3), e.g., as described above.

As indicated at block 404, the method may include determining a medium free start time. For example, wireless communication unit 104 (FIG. 1) may determine medium free start time 343 (FIG. 3), e.g., as described above.

As indicated at block 406, the method may include shifting the start time of the transmit slot to coincide with the medium free start time, for example, if the medium free start time is after the suggested start time. For example, wireless communication unit 104 (FIG. 1) may shift the start time of transmit slot 342 (FIG. 3) to time 343 (FIG. 3), e.g., as described above.

As indicated at block 408, the method may include setting a suggested start time of a subsequent transmit slot based on the shifted start time of the transmit slot. For example, wireless communication unit 104 (FIG. 1) may set the suggested start time 344 (FIG. 3) of transmit slot 345 (FIG. 3) at distance 360 (FIG. 3) from the shifted start time 343 (FIG. 3) of transmit slot 342 (FIG. 3), e.g., as described above.

As indicated by arrow 409, the method may include repeating the operations of blocks 404, 406 and 408 to set another subsequent transmit slot. For example, wireless communication unit 104 (FIG. 1) may shift the start time of transmit slot 345 (FIG. 3) to time 363 (FIG. 3), and set suggested start time 365 (FIG. 3) of transmit slot 347 (FIG. 3) at distance 362 (FIG. 3) from the shifted start time 363 (FIG. 3) of transmit slot 345 (FIG. 3), e.g., as described above.

Figure 5:
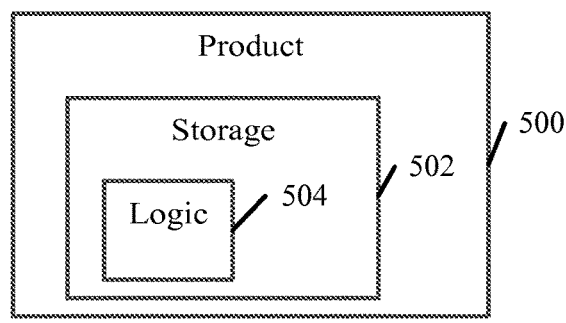
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 130 (FIG. 1), PCP 182 (FIG. 1), wireless communication unit 104 (FIG. 1), wireless communication unit 132 (FIG. 1), scheduler 119 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless communication unit comprising a scheduler to set a suggested start time of a first transmit slot to transmit over a wireless communication medium, and, if a start of a medium free time for the wireless communication medium is after the suggested start time, to shift the suggested start time to a shifted start time that coincides with the start of the medium free time, and to set a suggested start time of a second transmit slot based on the shifted start time; and circuitry coupled to the scheduler.

Example 2 includes the subject matter of Example 1, and optionally, wherein, if a start of a subsequent medium free time for the wireless communication medium is after the suggested start time of the second transmit slot, the scheduler is to shift the suggested start time of the second transmit slot to a subsequent shifted start time that coincides with the start of the subsequent medium free time, and to set a suggested start time of a third transmit slot based on the subsequent shifted start time.

Example 3 includes the subject matter of Example 2, and optionally, wherein a distance between the suggested start time of the second transmit slot and the shifted start time of the first transmit slot is equal to a distance between the suggested start time of the third transmit slot and the shifted start time of the second transmit slot.

Example 4 includes the subject matter of any one of Examples 1-3, and optionally, wherein the wireless communication unit is to perform the functionality of a wireless network controller, the wireless communication unit is to announce at least one contention based access period (CBAP) covering at least a continuous time period from the suggested start time of the first transmit slot to an end of the second transmit slot.

Example 5 includes the subject matter of Example 4, and optionally, wherein the wireless communication unit is to announce a single CBAP covering at least the continuous time period.

Example 6 includes the subject matter of Example 4, and optionally, wherein the wireless communication unit is to announce a sequence of consecutive CBAPs covering at least the continuous time period.

Example 7 includes the subject matter of any one of Examples 1-6, and optionally, wherein the scheduler is to set the suggested start time of the second transmit slot at a predefined distance from the shifted start time of the first transmit slot.

Example 8 includes the subject matter of Example 7, and optionally, wherein a duration of the first transmit slot is equal to or lesser than the predefined distance.

Example 9 includes the subject matter of any one of Examples 1-8, and optionally, wherein the first and second transmit slots comprise transmit slots to transmit point to point (P2P) transmissions.

Example 10 includes a system comprising a processor; a memory; a radio; one or more antennas; and a wireless communication unit to set a suggested start time of a first transmit slot to transmit over a wireless communication medium, and, if a start of a medium free time for the wireless communication medium is after the suggested start time, to shift the suggested start time to a shifted start time that coincides with the start of the medium free time, and to set a suggested start time of a second transmit slot based on the shifted start time.

Example 11 includes the subject matter of Example 10, and optionally, wherein, if a start of a subsequent medium free time for the wireless communication medium is after the suggested start time of the second transmit slot, the wireless communication unit is to shift the suggested start time of the second transmit slot to a subsequent shifted start time that coincides with the start of the subsequent medium free time, and to set a suggested start time of a third transmit slot based on the subsequent shifted start time.

Example 12 includes the subject matter of Example 11, and optionally, wherein a distance between the suggested start time of the second transmit slot and the shifted start time of the first transmit slot is equal to a distance between the suggested start time of the third transmit slot and the shifted start time of the second transmit slot.

Example 13 includes the subject matter of any one of Examples 10-12, and optionally, wherein the wireless communication unit is to perform the functionality of a wireless network controller, the wireless communication unit is to announce at least one contention based access period (CBAP) covering at least a continuous time period from the suggested start time of the first transmit slot to an end of the second transmit slot.

Example 14 includes the subject matter of Example 13, and optionally, wherein the wireless communication unit is to announce a single CBAP covering at least the continuous time period.

Example 15 includes the subject matter of Example 13, and optionally, wherein the wireless communication unit is to announce a sequence of consecutive CBAPs covering at least the continuous time period.

Example 16 includes the subject matter of any one of Examples 10-15, and optionally, wherein the wireless communication unit is to set the suggested start time of the second transmit slot at a predefined distance from the shifted start time of the first transmit slot.

Example 17 includes the subject matter of Example 16, and optionally, wherein a duration of the first transmit slot is equal to or lesser than the predefined distance.

Example 18 includes the subject matter of any one of Examples 10-17, and optionally, wherein the first and second transmit slots comprise transmit slots to transmit point to point (P2P) transmissions.

Example 19 includes a method comprising setting a suggested start time of a first transmit slot to transmit over a wireless communication medium; and if a start of a medium free time for the wireless communication medium is after the suggested start time, shifting the suggested start time to a shifted start time that coincides with the start of the medium free time, and setting a suggested start time of a second transmit slot based on the shifted start time.

Example 20 includes the subject matter of Example 19, and optionally, comprising if a start of a subsequent medium free time for the wireless communication medium is after the suggested start time of the second transmit slot, shifting the suggested start time of the second transmit slot to a subsequent shifted start time that coincides with the start of the subsequent medium free time, and setting a suggested start time of a third transmit slot based on the subsequent shifted start time.

Example 21 includes the subject matter of Example 20, and optionally, wherein a distance between the suggested start time of the second transmit slot and the shifted start time of the first transmit slot is equal to a distance between the suggested start time of the third transmit slot and the shifted start time of the second transmit slot.

Example 22 includes the subject matter of any one of Examples 19-21, and optionally, comprising announcing at least one contention based access period (CBAP) covering at least a continuous time period from the suggested start time of the first transmit slot to an end of the second transmit slot.

Example 23 includes the subject matter of Example 22, and optionally, comprising announcing a single CBAP covering at least the continuous time period.

Example 24 includes the subject matter of Example 22, and optionally, comprising announcing a sequence of consecutive CBAPs covering at least the continuous time period.

Example 25 includes the subject matter of any one of Examples 19-24, and optionally, comprising setting the suggested start time of the second transmit slot at a predefined distance from the shifted start time of the first transmit slot.

Example 26 includes the subject matter of Example 25, and optionally, wherein a duration of the first transmit slot is equal to or lesser than the predefined distance.

Example 27 includes the subject matter of any one of Examples 19-26, and optionally, wherein the first and second transmit slots comprise transmit slots to transmit point to point (P2P) transmissions.

Example 28 includes a product including a non-transitory storage medium having stored thereon instructions that, when executed by a machine, result in setting a suggested start time of a first transmit slot to transmit over a wireless communication medium; and if a start of a medium free time for the wireless communication medium is after the suggested start time, shifting the suggested start time to a shifted start time that coincides with the start of the medium free time, and setting a suggested start time of a second transmit slot based on the shifted start time.

Example 29 includes the subject matter of Example 28, and optionally, wherein the instructions result in, if a start of a subsequent medium free time for the wireless communication medium is after the suggested start time of the second transmit slot, shifting the suggested start time of the second transmit slot to a subsequent shifted start time that coincides with the start of the subsequent medium free time, and setting a suggested start time of a third transmit slot based on the subsequent shifted start time.

Example 30 includes the subject matter of Example 29, and optionally, wherein a distance between the suggested start time of the second transmit slot and the shifted start time of the first transmit slot is equal to a distance between the suggested start time of the third transmit slot and the shifted start time of the second transmit slot.

Example 31 includes the subject matter of any one of Examples 28-30, and optionally, wherein the instructions result in announcing at least one contention based access period (CBAP) covering at least a continuous time period from the suggested start time of the first transmit slot to an end of the second transmit slot.

Example 32 includes the subject matter of Example 31, and optionally, wherein the instructions result in announcing a single CBAP covering at least the continuous time period.

Example 33 includes the subject matter of Example 31, and optionally, wherein the instructions result in announcing a sequence of consecutive CBAPs covering at least the continuous time period.

Example 34 includes the subject matter of any one of Examples 28-33, and optionally, wherein the instructions result in setting the suggested start time of the second transmit slot at a predefined distance from the shifted start time of the first transmit slot.

Example 35 includes the subject matter of Example 34, and optionally, wherein a duration of the first transmit slot is equal to or lesser than the predefined distance.

Example 36 includes the subject matter of any one of Examples 28-35, and optionally, wherein the first and second transmit slots comprise transmit slots to transmit point to point (P2P) transmissions.

Example 37 includes an apparatus comprising means for setting a suggested start time of a first transmit slot to transmit over a wireless communication medium; and means for, if a start of a medium free time for the wireless communication medium is after the suggested start time, shifting the suggested start time to a shifted start time that coincides with the start of the medium free time, and setting a suggested start time of a second transmit slot based on the shifted start time.

Example 38 includes the subject matter of Example 37, and optionally, comprising means for, if a start of a subsequent medium free time for the wireless communication medium is after the suggested start time of the second transmit slot, shifting the suggested start time of the second transmit slot to a subsequent shifted start time that coincides with the start of the subsequent medium free time, and setting a suggested start time of a third transmit slot based on the subsequent shifted start time.

Example 39 includes the subject matter of Example 38, and optionally, wherein a distance between the suggested start time of the second transmit slot and the shifted start time of the first transmit slot is equal to a distance between the suggested start time of the third transmit slot and the shifted start time of the second transmit slot.

Example 40 includes the subject matter of any one of Examples 37-39, and optionally, comprising means for announcing at least one contention based access period (CBAP) covering at least a continuous time period from the suggested start time of the first transmit slot to an end of the second transmit slot.

Example 41 includes the subject matter of Example 40, and optionally, comprising means for announcing a single CBAP covering at least the continuous time period.

Example 42 includes the subject matter of Example 40, and optionally, comprising means for announcing a sequence of consecutive CBAPs covering at least the continuous time period.

Example 43 includes the subject matter of any one of Examples 37-42, and optionally, comprising means for setting the suggested start time of the second transmit slot at a predefined distance from the shifted start time of the first transmit slot.

Example 44 includes the subject matter of Example 43, and optionally, wherein a duration of the first transmit slot is equal to or lesser than the predefined distance.

Example 45 includes the subject matter of any one of Examples 37-44, and optionally, wherein the first and second transmit slots comprise transmit slots to transmit point to point (P2P) transmissions.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication unit comprising:
a scheduler to set a suggested start time of a first transmit slot to transmit over a wireless communication medium, and, if a start of a medium free time for the wireless communication medium is after the suggested start time, to shift the suggested start time to a shifted start time that coincides with the start of the medium free time, and to set a suggested start time of a second transmit slot based on the shifted start time; and
circuitry coupled to the scheduler.

2. The wireless communication unit of claim 1, wherein, if a start of a subsequent medium free time for the wireless communication medium is after the suggested start time of the second transmit slot, said scheduler is to shift the suggested start time of the second transmit slot to a subsequent shifted start time that coincides with the start of the subsequent medium free time, and to set a suggested start time of a third transmit slot based on the subsequent shifted start time.

3. The wireless communication unit of claim 2, wherein a distance between the suggested start time of the second transmit slot and the shifted start time of said first transmit slot is equal to a distance between the suggested start time of the third transmit slot and the shifted start time of said second transmit slot.

4. The wireless communication unit of claim 1, wherein said wireless communication unit is to perform the functionality of a wireless network controller, said wireless communication unit is to announce at least one contention based access period (CBAP) covering at least a continuous time period from the suggested start time of said first transmit slot to an end of the second transmit slot.

5. The wireless communication unit of claim 4, wherein said wireless communication unit is to announce a single CBAP covering at least the continuous time period.

6. The wireless communication unit of claim 4, wherein said wireless communication unit is to announce a sequence of consecutive CBAPs covering at least the continuous time period.

7. The wireless communication unit of claim 1, wherein said scheduler is to set the suggested start time of said second transmit slot at a predefined distance from the shifted start time of said first transmit slot.

8. The wireless communication unit of claim 7, wherein a duration of said first transmit slot is equal to or lesser than said predefined distance.

9. The wireless communication unit of claim 1, wherein said first and second transmit slots comprise transmit slots to transmit point to point (P2P) transmissions.

10. A system comprising:
a processor;
a memory;
a radio;
one or more antennas; and
a wireless communication unit to set a suggested start time of a first transmit slot to transmit over a wireless communication medium, and, if a start of a medium free time for the wireless communication medium is after the suggested start time, to shift the suggested start time to a shifted start time that coincides with the start of the medium free time, and to set a suggested start time of a second transmit slot based on the shifted start time.

11. The system of claim 10, wherein, if a start of a subsequent medium free time for the wireless communication medium is after the suggested start time of the second transmit slot, said wireless communication unit is to shift the suggested start time of the second transmit slot to a subsequent shifted start time that coincides with the start of the subsequent medium free time, and to set a suggested start time of a third transmit slot based on the subsequent shifted start time.

12. The system of claim 11, wherein a distance between the suggested start time of the second transmit slot and the shifted start time of said first transmit slot is equal to a distance between the suggested start time of the third transmit slot and the shifted start time of said second transmit slot.

13. The system of claim 10, wherein said wireless communication unit is to perform the functionality of a wireless network controller, said wireless communication unit is to announce at least one contention based access period (CBAP) covering at least a continuous time period from the suggested start time of said first transmit slot to an end of the second transmit slot.

14. The system of claim 10, wherein said wireless communication unit is to set the suggested start time of said second transmit slot at a predefined distance from the shifted start time of said first transmit slot.

15. A method to be performed by a wireless communication device, the method comprising:
setting a suggested start time of a first transmit slot to transmit over a wireless communication medium; and
if a start of a medium free time for the wireless communication medium is after the suggested start time, shifting the suggested start time to a shifted start time that coincides with the start of the medium free time, and setting a suggested start time of a second transmit slot based on the shifted start time.

16. The method of claim 15 comprising:
if a start of a subsequent medium free time for the wireless communication medium is after the suggested start time of the second transmit slot, shifting the suggested start time of the second transmit slot to a subsequent shifted start time that coincides with the start of the subsequent medium free time, and setting a suggested start time of a third transmit slot based on the subsequent shifted start time.

17. The method of claim 15 comprising announcing at least one contention based access period (CBAP) covering at least a continuous time period from the suggested start time of said first transmit slot to an end of the second transmit slot.

18. The method of claim 15 comprising setting the suggested start time of said second transmit slot at a predefined distance from the shifted start time of said first transmit slot.

19. A product including a non-transitory storage medium having stored thereon instructions that, when executed by a machine, result in:
setting a suggested start time of a first transmit slot to transmit over a wireless communication medium; and
if a start of a medium free time for the wireless communication medium is after the suggested start time, shifting the suggested start time to a shifted start time that coincides with the start of the medium free time, and setting a suggested start time of a second transmit slot based on the shifted start time.

20. The product of claim 19, wherein the instructions result in, if a start of a subsequent medium free time for the wireless communication medium is after the suggested start time of the second transmit slot, shifting the suggested start time of the second transmit slot to a subsequent shifted start time that coincides with the start of the subsequent medium free time, and setting a suggested start time of a third transmit slot based on the subsequent shifted start time.

21. The product of claim 20, wherein a distance between the suggested start time of the second transmit slot and the shifted start time of said first transmit slot is equal to a distance between the suggested start time of the third transmit slot and the shifted start time of said second transmit slot.

22. The product of claim 19, wherein the instructions result in announcing at least one contention based access period (CBAP) covering at least a continuous time period from the suggested start time of said first transmit slot to an end of the second transmit slot.

23. The product of claim 19, wherein the instructions result in setting the suggested start time of said second transmit slot at a predefined distance from the shifted start time of said first transmit slot.

24. The product of claim 23, wherein a duration of said first transmit slot is equal to or lesser than said predefined distance.

* * * * *